United States Patent
Sahyoun et al.

(10) Patent No.: US 10,414,126 B2
(45) Date of Patent: Sep. 17, 2019

(54) GLASS PANEL WITH INTEGRATED ELECTRONIC DEVICE

(71) Applicants: AGC Glass Europe, Louvain-la-Neuve (BE); SMARTIWORKS CO LTD, Seongnam (KR)

(72) Inventors: Xavier Sahyoun, Halle (BE); Jana Vanderheijden, Halle (BE); Michael Demeyere, Forville (BE); Song Koon, Seongnam (KR); Lee Min Sang, Seongnam (KR)

(73) Assignees: AGC GLASS EUROPE, Louvain-la-Neuve (BE); SMARTIWORKS CO LTD, Seongnam (KR)

( * ) Notice: Subject to any disclaimer, the term of this patent is extended or adjusted under 35 U.S.C. 154(b) by 0 days.

(21) Appl. No.: 15/770,022

(22) PCT Filed: Oct. 10, 2016

(86) PCT No.: PCT/EP2016/074227
§ 371 (c)(1),
(2) Date: Apr. 20, 2018

(87) PCT Pub. No.: WO2017/067809
PCT Pub. Date: Apr. 27, 2017

(65) Prior Publication Data
US 2018/0311935 A1  Nov. 1, 2018

(30) Foreign Application Priority Data
Oct. 23, 2015 (EP) ..................................... 15191229

(51) Int. Cl.
*B32B 17/10* (2006.01)
*F21V 33/00* (2006.01)
(Continued)

(52) U.S. Cl.
CPC .. *B32B 17/10541* (2013.01); *B32B 17/10055* (2013.01); *B32B 17/10761* (2013.01);
(Continued)

(58) Field of Classification Search
CPC ........ B32B 17/10541; B32B 17/10788; B32B 17/10761; B32B 17/10779;
(Continued)

(56) References Cited

U.S. PATENT DOCUMENTS 7,834,548 B2 * 11/2010 Jousse ............... B32B 17/10036
313/498
2009/0174300 A1   7/2009 Jousse et al.

FOREIGN PATENT DOCUMENTS

| DE | 10 2004 039 883 B3 | 6/2006 | |
| DE | 102004039883 B3 * | 6/2006 | ....... B32B 17/10036 |
| WO | WO 2012/031647 A1 | 3/2012 | |

OTHER PUBLICATIONS

International Search Report dated Nov. 29, 2016 in PCT/EP2016/074227 filed Oct. 10, 2016.

* cited by examiner

*Primary Examiner* — Kevin Quarterman
(74) *Attorney, Agent, or Firm* — Oblon, McClelland, Maier & Neustadt, L.L.P.

(57) ABSTRACT

The invention relates to a panel comprising (i) at least a first (100) outer and a second (200) inner glass sheet, each comprising an inner and an outer face, combined together by a means (220) of maintaining the two glass sheets at a certain distance between the two glass sheets (100, 200) and (ii) at least one electroluminescent mean (302) provided between the at least a first (100) and a second glass sheet (200) and arranged on the surface of the inner face (201) of the second (200) inner glass sheet. According to the invention, at least one recess (310) is provided in the first glass (Continued)

sheet (100) and arranged face to face with one electroluminescent mean provided on the surface of the inner face (201) of the second glass sheet (200) and wherein a gasket (500) comprising light guiding mean is provided on the electroluminescent mean (302) and extends through the at least one recess (310).

17 Claims, 4 Drawing Sheets

(51) Int. Cl.
  *F21Y 101/00*   (2016.01)
  *F21Y 105/10*   (2016.01)
  *F21Y 115/10*   (2016.01)

(52) U.S. Cl.
  CPC .. *B32B 17/10779* (2013.01); *B32B 17/10788* (2013.01); *F21V 33/006* (2013.01); *B32B 2457/20* (2013.01); *F21Y 2101/00* (2013.01); *F21Y 2105/10* (2016.08); *F21Y 2115/10* (2016.08)

(58) Field of Classification Search
  CPC ........... B32B 17/10055; B32B 2457/20; F21Y 2101/00; F21Y 2115/10; F21Y 2105/10; F21V 33/006
  See application file for complete search history.

GLASS PANEL WITH INTEGRATED ELECTRONIC DEVICE

The invention relates to a glass panel comprising an at least one electroluminescent mean. Such a glass panel can be for instance a laminated glass panel or a multiple glazing panel. More particularly, such a glass panel comprises at least one electroluminescent mean provided between at least a first and a second glass sheet.

TECHNICAL BACKGROUND

In the automotive, aviation and other industries, laminated glass panels with integrated electroluminescent mean components, such as light emitting diodes (LED), or with heating facilities are known, e.g. for displaying information or for lighting purposes. For these application areas, the manufacturing of a laminated glass panel with electronic components typically comprises the steps of depositing a conductive layer on the first glass substrate, realization of electronic circuits in the conductive layer and depositing of electronic components on the conductive layer, connected to the electronic circuits. The plastics interlayer is then deposited on the conductive layer. The sandwich is obtained by the application of the second glass substrate on the plastics interlayer, which is then laminated as outlined before.

Today, façades of architectural building not only serve as a traditional wall but also as a means to enhance aesthetic look through artistic patterns and shapes. It also serves as media contents platform via various advertising and promoting measures.

Today, multiple glazing panels comprising electroluminescent means and particularly comprising Light Emitting Diodes (LEDs) as electroluminescent means, are already available in the market.

Figure 1:
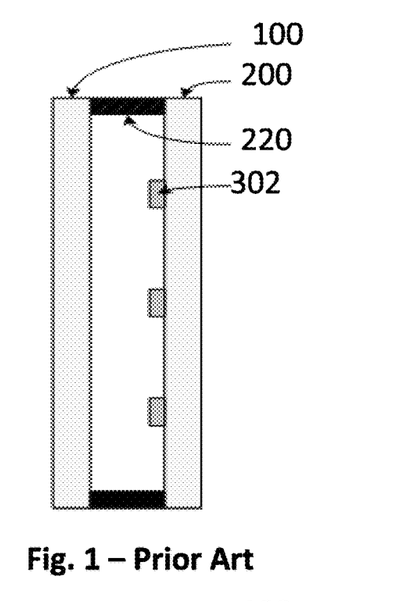

A glazing known from the prior art shown in FIG. 1 is an insulating glazing unit (IGU) comprises two glass sheets 100, 200, one of which being provided with a conductive coating to power the LEDs 302, separated by an air gap and assembled thanks to a spacer material 220. A power and/or data cable is provided (not shown in the drawing). These types of glazing can be incorporated in building façades from commercial buildings, such as offices, conference buildings or hotels, but also residential buildings. The first glass sheet 100 is in contact with the exterior, and the second glass sheet 200 is in contact with the interior of the building. The LEDs are illuminating to the outside, such that a video or image can be seen from the exterior of the building. The LEDs are mainly used during the night. During the day, the contrast between the LED lighting and the natural light would be too low. However, the main disadvantage of the above described system is the back-reflections, to the interior of the building. When the buildings are occupied during nighttime, the back reflections can be unwanted or even hazardous for the users or habitants of the building. The back-reflections have to be avoided at maximum.

The light, visible at the inside of the building, can be divided in 3 types:
1. Type 1—Light coming directly from the LED 302; this can be any residual light originating from the LED itself: either backward illumination coming from the LED, or any backward reflections on the LED surface, or light that is visible through the back-surface of the LED,
2. Type 2—Light originating from reflections on the interior surface of the glass sheet 100; this is the surface at the inside of the IGU.
3. Type 3—Light originating from reflection on the exterior surface of the glass sheet 100; this is the surface in contact with the outside air.

It is understood that some of these light rays will not be immediately reflected back into the building, but could be reflected multiple times in the air gap or glass sheets. However, they will always originate from one of the above. Type 1, light rays can be blocked placing the LED on an opaque PCB or using stickers or opaque coating on the same position as the LEDs but at the opposite glass surface. The opaque area has to be slightly larger than the LED. The sticker can also have aesthetic reasons, to hide the LED and/or PCB. Regarding Type 2 and 3 light rays, the LED has a certain view angle, and will therefore emit light rays at different angles within this view angle. The light rays will travel from the LED through the air gap. Some light rays will then be reflected on the first glass sheet (on interior and exterior surface), travel again through the air gap and the 2nd glass sheet and finally inside the building. During this route, the light will spread out, this is called beam divergence. The beam diameter at the exit of the IGU to the inside of the building, is dependent on the thickness of the glass sheets, the thickness of the air gap and the view angle of the LED. This spreading of the light will make that a small sticker is not sufficient to block these reflections. Increasing the sticker diameter would no longer be aesthetically acceptable and would block too much of the natural light during the day, losing the transparent aspect of the IGU.

Figure 2A:
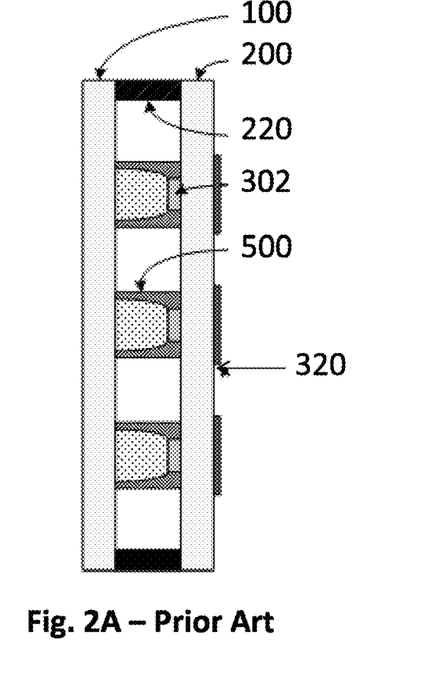
Figure 2B:
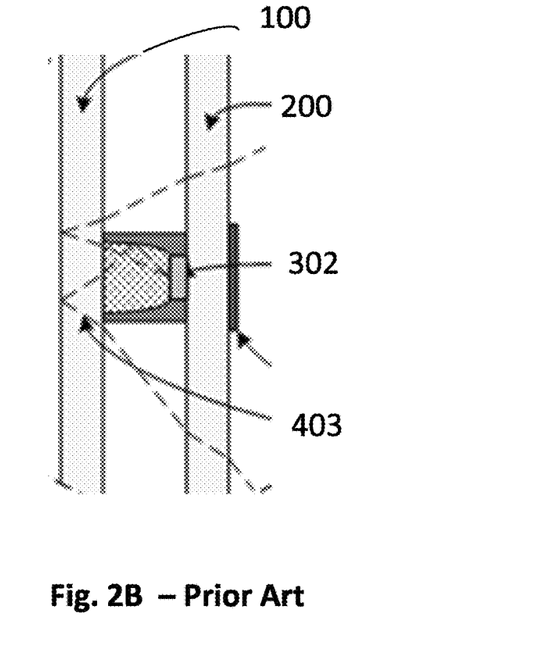

One glazing of prior art comprising LEDs is shown in FIGS. 2A and 2B. This type of glazing is improved compared to the glazing described above. Thus, such glazing proposes a solution to eliminate the reflections to the inside of the building, originating on the interior surface of the glass sheet 1 (Type 2 light rays as described above). For this, an optical component, called gasket 500 is proposed. This gasket 500 contains a light guiding element that guides the light from the LED 302 to the outside. Here, the back-reflections on the interior surface of the first glass sheet (type 2) are reflected back into the gasket. Same as for FIGS. 1A and 1B a sticker of print 320 in placed behind the LED. However the type 3 are still visible from the inside.

Figure 3:
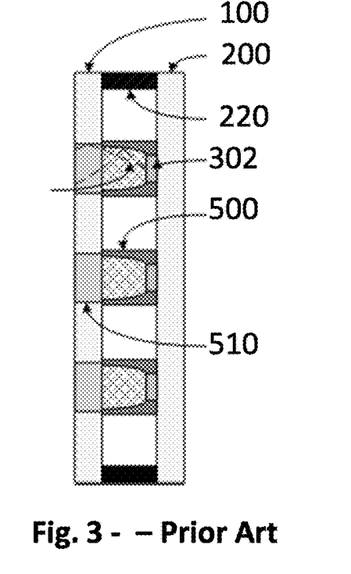

FIG. 3 shows an improvement of the solution proposed in FIGS. 2A and 2B. The glazing of prior art as represented in FIG. 3 proposes a solution for the type 3 reflections. As can be seen in FIG. 3, a cylindrical light guide lens 510 is integrated in the first outer glass sheet 100 at the same position as the LED 302 and the gasket 500. Ideally this lens has the same or slightly bigger diameter as the exit surface of the gasket's light guiding element. The diameter should be smaller than the edge of the gaskets.

The lens 510 has a protective mirror coating around its cylindrical edge such that all the light is reflected inside the lens and no light can exit through its sides.

Any reflections that occur on the interior or exterior surface of the first outer glass sheet 100 are reflected back into the lens 510 and the gasket 500. Therefore, no light will be visible from the inside of the building. However, the solution proposed by the glazing represented in FIG. 3 has 3 main disadvantages:
  the integration and the gluing of the lenses inside glass sheet 1 is technically very difficult to do on a large scale with a sufficient quality, high precision and productivity speed.
  the tightness of your double glazing panel is lost. The gluing of the lenses cannot guarantee a good gas and humidity tightness.

The exterior surface of glass sheet 1 will not be completely flat due to differences in height between the glass sheet and the lens or misalignment issues. Thus, dust and dirt particles will accumulate around the lens or on the lens surface, which is difficult to clean and will result in absorption or reflection of more light rays.

Figure 4:
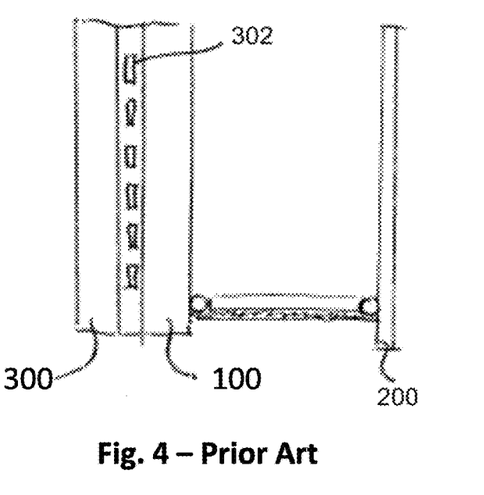

DE102008009775 describes a multiple glazing panel incorporating LEDs as shown in FIG. 4. The windows consists of three glass sheets 100, 200 and 300. The first two glass sheets 100, 300 are laminated together with a thermoplastic film 230. The electronic components, such as LEDs, are integrated within the lamination. The integration of electroluminescent mean between 2 glass sheets is for example described in patent WO2009013327. The laminated sheet is then assembled with the other glass sheet 200, to make the multiple glazing panel. The third glass sheet 300 is in contact with the exterior, and the second glass sheet 200 is in contact with the interior of the building. The LEDs are illuminating to the outside. The Type two reflections on the interior surface of glass sheet 300 (inside the lamination) are reduced to a minimum because the refractive indices between the thermoplastic film and the first glass sheet are very similar, reducing the reflections to a minimum. However, this setup will still have light coming from the LED itself (Type 1) and back reflections on the exterior surface of glass sheet 300 (Type 3). In the solution proposed in DE102008009775, the LEDs are integrated within the laminated cover glass. This causes some disadvantages such as:
- the light output of the LEDs is much lower when integrated inside the laminate. The LED is designed to illuminate in an air medium. When the LED is illuminating in the interlayer, approx. 20-50%, depending on the LED type, of the light rays will get stuck in the laminated structure due to total internal reflection,
- the process to integrate the LEDs is more difficult to implement,
   - all types of LEDs cannot be laminated,
   - all types of conductive coatings cannot be used,
- heat dissipation within the interlayer is lower, as compared with the air medium, causing local heat buildup,
- this type of structure cannot be used in spandrels, or other applications with considerable heat build-up, as the interlayer cannot resist high temperatures.

Figure 5A:
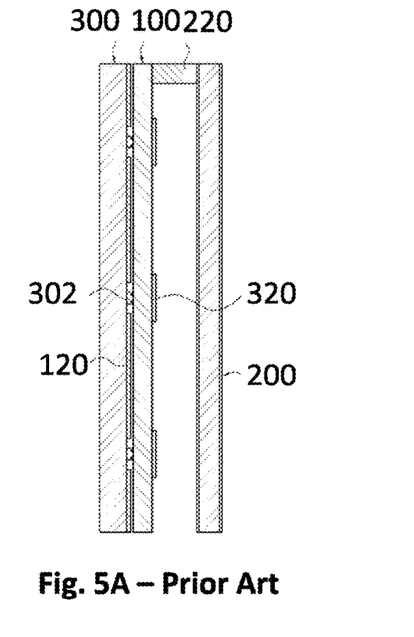
Figure 5B:
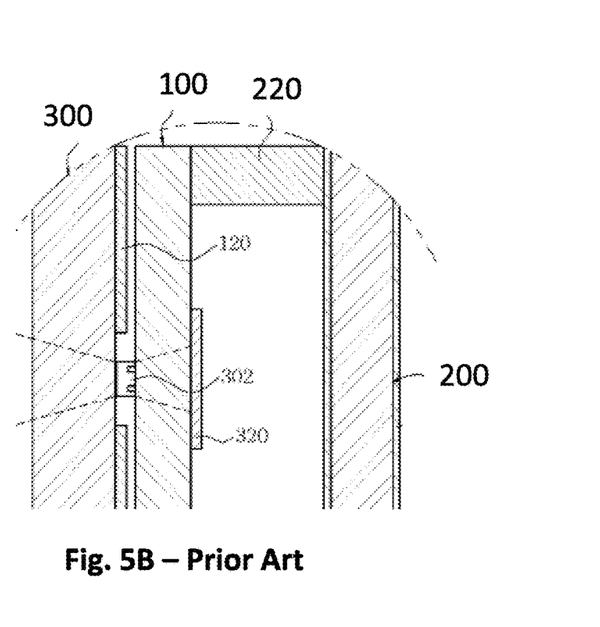

KR101484185 proposes to eliminate the other reflections described in DE102008009775, a solution including a third glass sheet 300 with a semi-transparent coating layer 120 having through-holes to allow light to pass from a back surface to the front side. A first glass sheet 100 with a conductive coating (Indium Tin Oxide in this case) on which the LEDs 302 are glued, the LEDs are located at the same positioning as the through-holes. The two glass sheets 100 and 300 are combined using a transparent resin. A second glass sheet 200 is assembled together using a spacer 220, which is vertically arranged to be horizontally separated with a predetermined distance on the back surface of the first glass sheet. A sticker 320 or opaque coating is used on the back of glass sheet 100 to block the Type 1 light rays. The semi-transparent coating 120 is used to prevent a glare but also to prevent the reflections on the exterior surface of the third glass sheet 300 to enter back inside the insulated glass unit (IGU). The coating is highly reflective, therefore most of the inside reflections will be reflected back outside. A small part of the light rays will also be absorbed. However some light rays will still be transmitted as the coating is semi-transparent. Therefore the solution is not completely reflection free. The through-holes in the coating have a diameter which is bigger than the LED but smaller than the sticker, for aesthetic reasons. The through-holes can be made using partial masking during coating deposition or laser decoating after coating deposition. Such a glazing panel as described in KR101484185 is represented in FIGS. 5A and B.

Some other versions of multiple glazing panels incorporating LEDs do exist such as in Korean patent 20-0431370 that describe the use of integrated LED bars instead of individual LEDs. However, the above principles to reduce back reflections will always stay similar meaning:
- place LEDs on PCB to block the Type 1 light rays,
- place sticker or opaque coating/print on opposite glass surface to eliminate Type 1 light rays,
- use a gasket or light guiding element inside the air gap to eliminate Type 2 reflections,
- use a cylindrical lens in glass sheet 1 to eliminate Type 3 reflections,
- use highly reflective coating to block any back reflections passing to the interior.

Accordingly, it is the object of the invention to provide a solution to block any light that could be reflected by a at least one electroluminescent integrated into a glass panel, to the inside of the building or a vehicle wherein such as panel is placed, and therefore would be visible for the users of said building or vehicle.

This object is addressed by a panel comprising:
a. at least a first outer and a second inner glass sheet, each comprising an inner and an outer face, combined together by a means of maintaining the two glass sheets at a certain distance between the two glass sheets,
b. at least one electroluminescent mean provided between the at least a first and a second glass sheet and arranged on the surface of the inner face of the second inner glass sheet.

According to the invention, at least one recess is provided in the first glass sheet and arranged face to face with one electroluminescent mean provided on the surface of the inner face of the second glass sheet and wherein a gasket comprising light guiding mean is provided on the electroluminescent mean and extends through the at least one recess.

According to the invention, a recess means a space, such as a niche or alcove, set back or indented into the glass sheet. This could be a partial hole which does not perforate the full glass sheet.

According to the invention, the type 2 light rays are reflected back in the gasket which is a light-tight structure. Furthermore, the type 3 light rays will be blocked by the gasket walls. The top surface of these walls has an absorbing finish, to absorb any light that falls on it. Now to be able to catch all the type 3 light rays, the width of the gasket walls have to be sufficiently wide. The exact width will depend on the thickness of the thin glass and the beam divergence at the exit of the gasket. The thinner the glass, the less the light will be spread out further.

By playing on the design of the light guiding element within the gasket the beam diameter and divergence can be altered. Together with the choice for the thickness of the glass, a compromise can be found for an ideal gasket diameter (and therefore hole diameter) and gasket wall thickness.

Contrary to the glazing of prior art represented in FIG. 3, the at least one recess is not a through-hole that perforates the first glass sheet completely thus the tightness of the panel is guaranteed.

Furthermore, a completely flat surface of the first outer glass sheet can be used and therefore an easy to clean surface where dust accumulation around the electroluminescent means and particularly LEDs positions is not an issue.

According to the invention, the opening has a shape of cylindrical hole

According to one embodiment of the present invention, the panel according to the invention comprises further a third outer glass sheet laminated together with the first glass sheet with at least one thermoplastic interlayer and wherein the at least one recess is opened through the first glass sheet and the thermoplastic interlayer arranged face to face with one electroluminescent mean provided on the surface of the inner face of the second glass and wherein a gasket with light guiding mean is provided on the electroluminescent mean and extends through the at least one recess.

Contrary to the glazing of prior art as represented in FIG. 3, the at least one recess is provided only in the first glass sheet, thus by laminating the first glass sheet with the third glass sheet, the tightness of the panel is guaranteed.

According to one embodiment of the present invention, the panel according to the invention comprises further a third glass sheet laminated together with the first outer glass sheet with at least one thermoplastic interlayer and wherein at least one opening is provided in the third glass sheet and the thermoplastic interlayer arranged face to face with one electroluminescent mean provided on the surface of the inner face of the second glass and wherein a gasket with light guiding mean is provided on the electroluminescent mean and extends through the at least one partial opening wherein the thermoplastic interlayer is a polyvinyl butyral or an ethylene-vinyl acetate interlayer.

According to one embodiment of the present invention, the panel comprises a third outer glass sheet having a thickness comprised between 0.1 to 2 mm.

The thickness of the third outer glass sheet is limited to reduce the divergence of the light rays and therefore the reflected beam diameter. This is an advantage of the design of the gasket, in specific the gasket wall thickness.

According to one embodiment of the present invention, the panel comprises a second inner glass sheet having a thickness comprised between comprised between 0.1 to 25 mm.

The thickness of this glass sheet should secure the mechanical strength of the laminated panel and the insulated glazing unit (IGU) panel.

According to one preferred embodiment of the present the electroluminescent mean is a plurality of light emitted diodes (LEDs) and those LEDs are provided onto a PCB. Thus, by placing the LEDs onto a PCB, Type 1 light rays are blocked by using a PCB under the LED, which is slightly bigger than the LED. Each PCB can contain one or several LEDs.

According to another embodiment of the present invention, a sticker or some paint/coating can be provided on the opposite glass surface in order to improve the aesthetic of the panel. Thus, due to the invention, not only type 1 light rays are blocked but the type 2 light rays are also reflected back in the gasket which is a light-tight structure and the type 3 light rays will be blocked by the gasket walls. Thus, the present invention provide a solution to block any light that could be reflected by a at least one electroluminescent integrated into a glass panel, to the inside of the building or a vehicle wherein such as panel is placed, and therefore would be visible for the users of said building or vehicle.

According to one embodiment of the present invention, the recess provided in the first glass sheet and arranged face to face with one electroluminescent mean provided on the surface of the inner face of the second glass sheet, is slightly bigger than the gasket diameter. Thus, the assembly is facilitated, the positioning tolerances of the hole and gasket are also compensated.

According to one embodiment of the present invention, the panel comprising at least one electroluminescent mean according to the invention is placed on a façade of a building.

According to one embodiment of the present invention, the panel according to the invention has an inner glass smaller than the outer glass to facilitate the fixation of the panel to a façade.

According to one embodiment of the present invention, the panel according to the invention is an insulated glazing panel wherein the at least a first and a second glass sheets are separated by a spacer disposed between the at least first and second glass sheets and extends along the periphery of the glass sheets. Thus, the panel may be used both as an insulated glazing as a means to enhance aesthetic look through artistic patterns and shapes. It also serves as media contents platform via various advertising and promoting measures.

According to another embodiment of the present invention, the spacer disposed between the at least first and second glass sheets and extends along the periphery of the glass sheets has a rectangular shape or may follow the same shape as the inner glass sheet with the cut-out. Indeed, in the area of the cut-out of the inner glass, the spacer may follow the shape of the cutout in order to correctly insure the adhesion of the first and the second glass sheet to the spacer.

According to the invention, the outer glass sheet means the glass which is in contact with the exterior side and the inner glass sheet means the glass which is in contact with the interior side.

According to the present invention, the electroluminescent mean is a plurality of light emitted diodes (LEDs), or a plurality of LED bars.

According to the present invention, the electroluminescent mean is a plurality of light emitted diodes (LEDs) provided on the surface of the inner face of the second glass sheet. Thus, the glass panel may be used to deliver a message, an advertisement, or purely aesthetic. It is further preferred that a plurality of LEDs are provided, wherein the plurality of LEDs are either electrically connected in parallel or in series by means of a plurality of inner conductive layers, and wherein the electric components are preferably electrically connected to an inner conductive layers by means of gluing and/or soldering.

A glass panel comprising a plurality of LEDs disposed between the first of the second glass sheets are well known from the prior art.

The term "glass", within the meaning of the invention, is understood to mean a completely amorphous material sheet of glass, thus excluding any crystalline material, even partially crystalline material (such as, for example, glass-crystalline or glass-ceramic materials).

The glass according to the invention is made of glass which can belong to various categories. The glass can thus be a glass of soda-lime-silica, aluminosilicate or borosilicate type, and the like. Preferably and for reasons of lower production costs, the glass sheet according to the invention is a sheet of soda-lime-silica glass.

The glass sheet according to the invention can be a glass sheet obtained by a floating process, a drawing process, a rolling process or any other process known to manufacture a glass sheet starting from a molten glass composition. According to a preferred embodiment according to the invention, the glass sheet is a float glass sheet. The term "float glass sheet" is understood to mean a glass sheet formed by the float glass process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

The glass sheet according to the invention can have varied and relatively small sizes. It can, for example, have sizes ranging from 150 mm by 150 mm up to 3000 mm by 1600 mm.

The glass sheet according to the invention can have a thickness varying between 0.1 and 25 mm. Advantageously, in the case of the application of touch panels, the glass sheet according to the invention can have a thickness varying between 0.1 and 6 mm. Preferably, in the case of the touch screens application, for reasons of weight, the thickness of the glass sheet according to the invention is from 0.1 to 2.2 mm.

According to another embodiment of the present invention, an anti-reflective coating may be provided on the surface of glass sheet.

The object of the invention is further addressed by a method for manufacturing a panel as claimed according to the invention.

The method for manufacturing a panel according to the invention is advantageous, since it allows to propose a solution to block any light that could be reflected by a at least one electroluminescent integrated into a glass panel, to the inside of the building or a vehicle wherein such as panel is placed, and therefore would be visible for the users of said building or vehicle.

These and other aspects of the invention will be apparent from and elucidated with reference to the embodiments described hereinafter.

BRIEF DESCRIPTION OF THE DRAWINGS

FIGS. 1 to 5B schematically shows a panel according to prior art.

FIG. 8 schematically shows a panel of insulated glass unit according to a preferred embodiment of the invention in a partial cross section view.

DETAILED DESCRIPTION OF THE ILLUSTRATIVE EMBODIMENTS

The drawings described are only schematic and are non-limiting. In the drawings, the size of some of the elements may be exaggerated and not drawn on scale for illustrative purposes. The mere fact that certain measures are recited in mutually different dependent claims does not indicate that a combination of these measured cannot be used to advantage. Any reference signs in the claims should not be construed as limiting the scope.

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

The invention has been illustrated and described in the case of a panel of an insulated glass unit (IGU), nevertheless the invention can also be applied in all kind of glass panel comprising at least two glass substrates, for instance in a laminated glass panel, triple glazing . . . . In the case of a laminated glass panel according to the invention, the means of maintaining the first and the second glass sheets is at least one thermoplastic interlayer.

Figures 7A, 7B, 8:
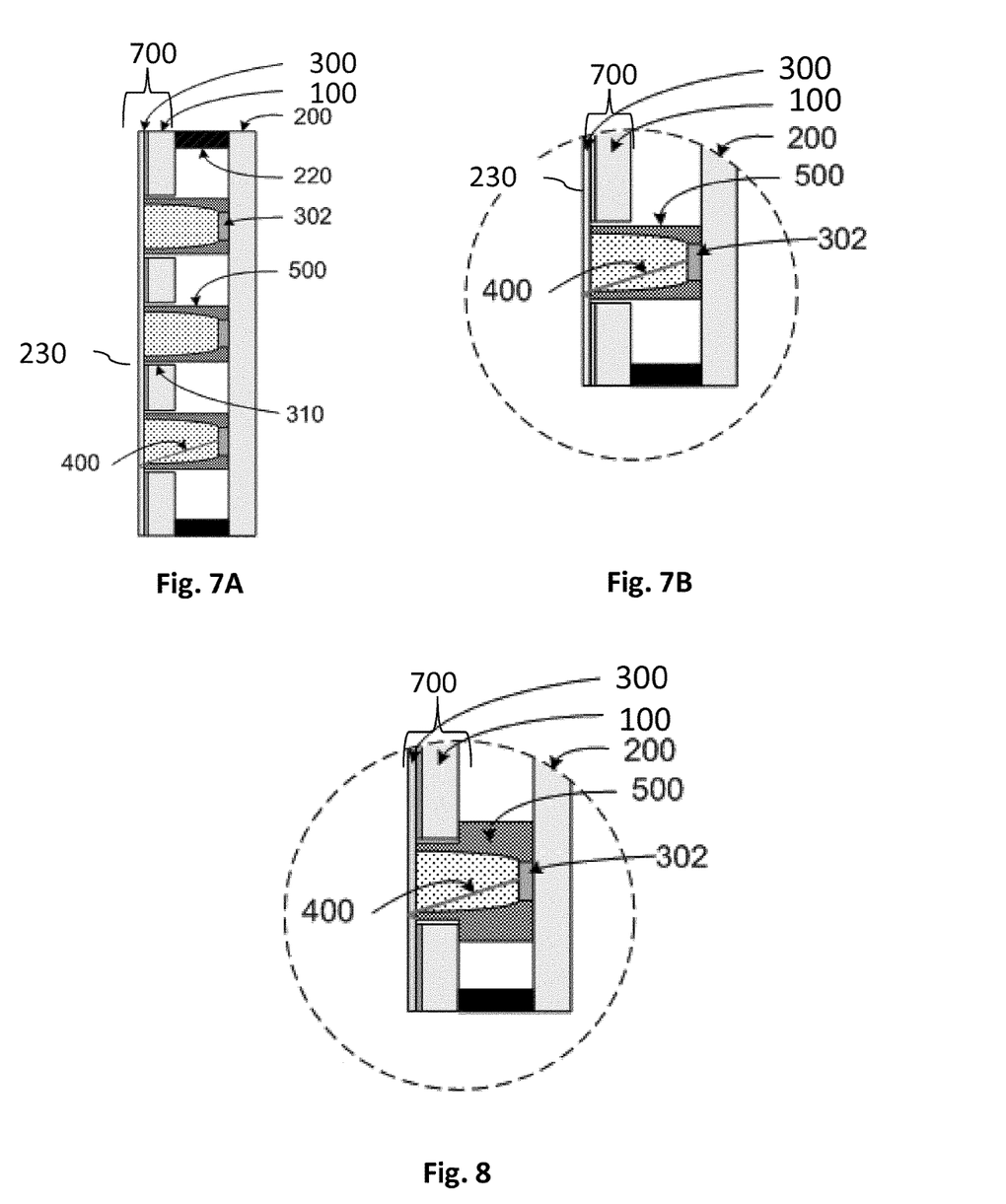

In FIGS. 7A and 7B, a glazing panel is represented with a laminated cover glass: the glazing panel comprising an electroluminescent mean is a panel comprising a minimum of three glass sheets 100, 200, 300. The first 100 and third glass 300 sheets are laminated together using a thermoplastic film 230 to form a laminated sheet 700. The resulting laminated sheet 700, called cover glass, is assembled with the second glass sheet 200, to make a multiple glazing panel. The third glass sheet 300 is in contact with the outside, while the second glass sheet 200 is in contact with the interior of the building. The electroluminescent mean 302 is a plurality of LEDs that is integrated between the first 100 and the second 200 glass sheets.

The first glass sheet 100 and the thermoplastic film 230 have holes 310, as recess, at the same positions as the electroluminescent elements 302. On top of the electroluminescent elements, a gasket 500 is placed, which extends through the hole 310 until the first glass sheet.

According to one embodiment of the present invention, the third glass sheet (300) is preferably a thin glass, with a thickness of around of 0.1 to 2 mm, however thicker glasses are also possible. The first and second glass sheet (100 and 200) can have a thickness of 0.1 to 25 mm.

The electroluminescent mean (302) may be a LED (mono or multicolor). Typically, the LED is placed onto a PCB which is slightly bigger than the LED. The use of the PCB is twofold:
  for blocking any residual light
  to facilitate the gluing and placement of the LED onto the glass sheet.

The hole (310) in the second glass sheet is slightly bigger than the gasket diameter to facilitate assembly and to compensate for positioning tolerances of the hole 310 and gasket 500.

The hole 310 can be drilled mechanically or cutout with a laser, water jet or plasma-treatment.

The gasket (500) is a structure which includes a light guiding element, to gather the light 400 of the electroluminescent elements and guide it to the exterior of the glass panel.

The Type 2 light rays are reflected back into the gasket which is a light-tight structure.

To be able to block all the Type 3 light rays, the width of the gasket walls have to be sufficiently wide. The exact width will depend on the thickness of the thin glass and the beam divergence at the exit of the gasket. The thinner the glass, the less the light will spread out further. The smaller the beam divergence (smaller view angle), the less the light will spread out further. The top of the walls is coated with an absorbing finishing, to absorb any light that falls on it.

By playing on the design of the light guiding element within the gasket the beam diameter and divergence can be altered. The design of the gasket can be used to optimize the light output and to control the optical performance as seen from the exterior of the building (mixing of light in case of multiple diodes, beam diameter, beam divergence).

Together with the choice for the thickness of the glass, a compromise can be found for an ideal gasket diameter (and therefore hole diameter) & gasket wall thickness.

The gasket 500 could be glued onto the LED PCB or onto the glass (surrounding the LED).

Concerning the shape of the gasket 500, the outer shape of the gasket could be cylindrical, conic, or any other shape but preferably something which has a circular symmetry. As can be seen in FIG. 8, the gasket 500 could also have two different diameters for the top part and the bottom part. The top part: part that is located in the hole 310. The bottom part: part that is located in the air gap. The bottom part can have a bigger diameter as the top part. This can be used for aesthetic reasons, such that an habitant of the building does not see the hole edges. Or for mechanical stability, the cover glass will then largely push onto the bottom part of the gasket, making sure that the stresses on the cover glass (for example due to wind or temperature changes), are transferred to the bottom part of the gasket. This is advisable to limit the stress concentration on the thin glass or on the thin, more fragile, part of the gasket.

The gasket 500 can be made out of different materials, an opaque material for the outside of the gasket for mechanical strength and light containment. A reflective material/coating for the inside of the gasket walls. The interior of the gasket could be empty or filled with a transparent material.

Optionally, a sticker or some paint/coating on the opposite glass surface can be used for aesthetic reasons or to block any type 1 light rays (if no PCB is used under the LED). The positioning of the sticker/paint/coating is on the third glass sheet, at the same position of the electroluminescent elements but at the opposite glass surface (located at the exterior of the glass panel). It has a diameter which is bigger than the LED and the gasket. As it is located on the interior side of the building, the sticker, paint or coating has to be resistant to cleaning, humidity & other external impacts.

Figure 6:
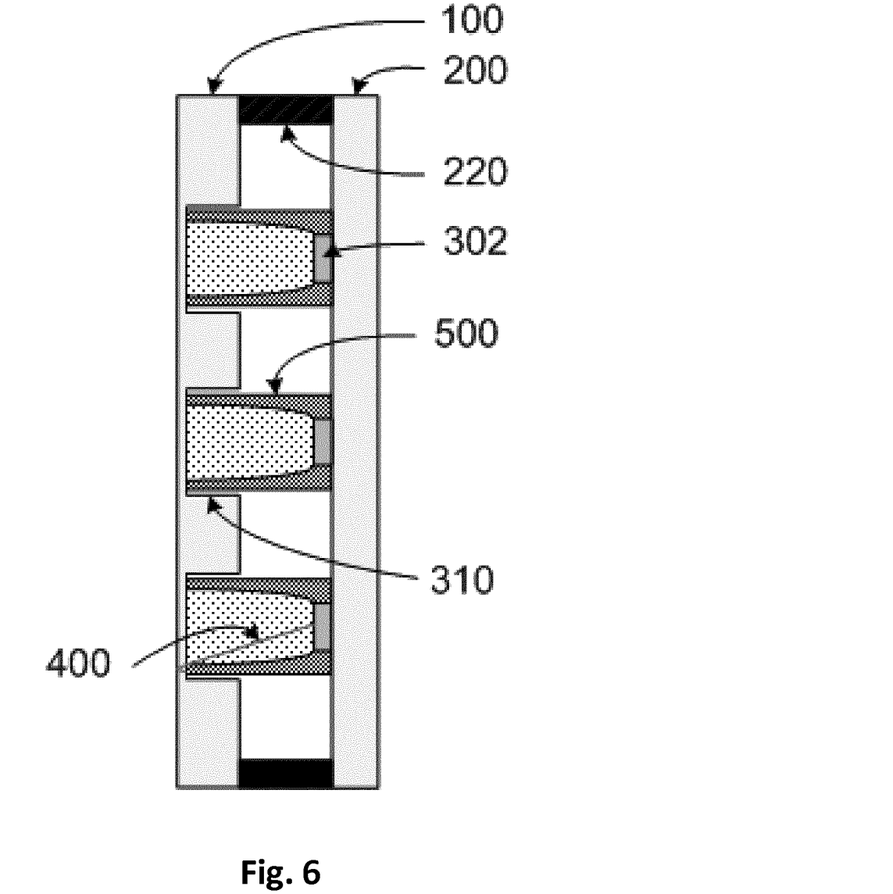
FIG. 6 schematically shows a panel of insulated glass unit according to a preferred embodiment of the invention in partial side and cross section view, as seen from the interior of the building FIGS. 7A and 7B schematically shows a panel of insulated glass according to one embodiment of the invention in a perspective side view, as seen from the exterior of the building structure.

FIG. 6 shows a glazing according to another embodiment of the present invention. In this glazing panel, the panel comprises a first glass sheet 100 also called cover glass provided with partial holes as recess. The glazing panel including electroluminescent elements 302, where the glazing comprises a minimum of two glass sheets. The first glass sheet 100, called cover glass, is assembled with the second glass sheet 200, to make a multiple glazing panel. The first glass sheet 100 is in contact with the outside, while the second glass sheet 200 is in contact with the interior of the building. The electroluminescent elements 302 are provided between the first 100 and second 200 glass sheet.

The first glass sheet has partial holes 310 at the same positions as the electroluminescent elements 302.

On top of the electroluminescent elements, a gasket 500 is placed, which extends through the hole 310 until the glass edge.

The first glass sheet (100) can have a thickness of 2 to 25 mm

The second glass sheet (200) can have a thickness of 0.1 to 25 mm

The electroluminescent element 302 and the gasket 500 are the same as described below for FIGS. 7 to 8.

The hole (310) diameter in the first glass sheet is slightly bigger than the gasket diameter, to facilitate assembly and to compensate for positioning tolerances of the hole 310 and gasket 500.

The hole is 310 not a through hole and stops at less than 0.5 mm from the opposite glass edge. The optical surface quality of the hole should be really good. The hole 310 could be drilled mechanically. A post treatment could be necessary to improve the surface quality of the bottom & walls of the hole.

The glass according to the invention is made of glass which can belong to various categories. The glass can thus be a glass of soda-lime-silica, aluminosilicate or borosilicate type, and the like. Preferably and for reasons of lower production costs, the glass sheet according to the invention is a sheet of soda-lime-silica glass.

The glass sheet according to the invention may advantageously be chemically or thermally tempered or annealed in order to avoid scratches and to enhance the resistivity of the upper part of the center console. Typically, this involves heating the glass sheet (coated or not) in a furnace to a temperature of at least 580° C., more preferably of at least about 600° C. and still more preferably of at least 620° C. before rapidly cooling down the glass substrate. This tempering and/or bending can take place for a period of at least 4 minutes, at least 5 minutes, or more in different situations.

The invention claimed is:

1. A panel comprising:
   a first outer and a second inner glass sheet, each comprising an inner and an outer face, combined together by a means of maintaining the first outer and second inner glass sheets at a certain distance between the first outer and second inner glass sheets,
   at least one electroluminescent means provided between the first outer and second inner glass sheets and arranged on a surface of the inner face of the second inner glass sheet,
   wherein at least one recess is provided in the first outer glass sheet and arranged face to face with the at least one electroluminescent means provided on the surface of the inner face of the second inner glass sheet and wherein a gasket comprising light guiding means is provided on the electroluminescent means and extends through the at least one recess; and
   a third outer glass sheet laminated together with the first outer glass sheet and at least one thermoplastic interlayer,
   wherein the at least one recess is opened through the first outer glass sheet and the at least one thermoplastic interlayer arranged face to face with the at least one electroluminescent means provided on the surface of the inner face of the second inner glass sheet.

2. The panel according to claim 1, wherein the third outer glass sheet has a thickness of 0.1 to 2 mm.

3. The panel according to claim 1, wherein the second inner glass sheet and the first outer glass sheet have a thickness of 0.1 to 25 mm.

4. The panel according to claim 1, wherein the at least one electroluminescent means is a plurality of light emitted diodes placed onto a PCB.

5. The panel according to claim 1, wherein the at least one recess is slightly bigger than a diameter of the gasket.

6. The panel according to claim 1, wherein the panel is placed on a façade of a building.

7. The panel according to claim 1, which is an insulated glazing panel and wherein the means of maintaining comprises a spacer disposed between the first outer and second inner glass sheets which extends along a periphery of the first outer and second inner glass sheets.

8. The panel according to claim 1, wherein the at least one thermoplastic interlayer is a polyvinyl butyral or an ethylene-vinyl acetate interlayer.

9. The panel according to claim 1, wherein the second inner glass sheet is smaller than the first or the third outer glass sheet, thereby facilitating fixation of the panel to a façade.

10. A method for manufacturing a panel comprising:
assembling together a first outer and a second inner glass sheet, each comprising an inner and an outer face, combined together by a means of maintaining the first outer and second inner glass sheets at a certain distance between the first outer and second inner glass sheets,
providing at least one electroluminescent means between the first outer and second inner glass sheets;
affixing the at least one electroluminescent means on a surface of the inner face of the second inner glass sheet by gluing or soldering the electroluminescent means onto the second inner glass sheet,
forming at least one recess in the first outer glass sheet such that the at least one recess is arranged face to face with the at least one electroluminescent means provided on the surface of the inner face of the second inner glass sheet;
gluing a gasket, including a light guiding means, on the at least one electroluminescent means or on the second inner glass sheet, the gasket extending through the at least one recess.

11. The method according to claim 10, further comprising:
laminating a third outer glass sheet together with the first outer glass sheet and at least one thermoplastic interlayer,
wherein the at least one recess is opened through the first outer glass sheet and the at least one thermoplastic interlayer arranged face to face with one electroluminescent means provided on the surface of the inner face of the second inner glass, and
wherein the gasket including the light guiding means is provided on the at least one electroluminescent means.

12. The method according to claim 10,
wherein forming the at least one recess through the first outer glass sheet comprises forming the recess by at least one of mechanically drilling or cutting out with a laser, waterjet, or plasma-treatment,
the method further comprising:
laminating the first and third glass sheets together with the at least one thermoplastic interlayer to form a laminated sheet, and
assembling the second inner glass sheet and the laminated sheet together.

13. The method according to claim 10, wherein the at least one electroluminescent means and the gasket are assembled together prior to gluing them onto the second inner glass sheet.

14. The method panel according to claim 10, wherein the at least one electroluminescent means is a plurality of light emitted diodes placed onto a PCB.

15. The method according to claim 10, wherein the second inner glass sheet and the first outer glass sheet have a thickness of 0.1 to 25 mm.

16. The method according to claim 10, wherein the means of maintaining comprises a spacer disposed between the first outer and second inner glass sheets which extends along a periphery of the first outer and second inner glass sheets.

17. The method according to claim 10, wherein the at least one thermoplastic interlayer is a polyvinyl butyral or an ethylene-vinyl acetate interlayer.

* * * * *